(12) United States Patent
Wang et al.

(10) Patent No.: US 9,846,942 B2
(45) Date of Patent: Dec. 19, 2017

(54) METHOD AND SYSTEM FOR DETERMINING A POSE OF CAMERA

(71) Applicant: Metaio GmbH, Munich (DE)

(72) Inventors: Lejing Wang, Munich (DE); Peter Meier, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/028,474

(22) PCT Filed: Oct. 9, 2013

(86) PCT No.: PCT/EP2013/071037
§ 371 (c)(1),
(2) Date: Apr. 11, 2016

(87) PCT Pub. No.: WO2015/051834
PCT Pub. Date: Apr. 16, 2015

(65) Prior Publication Data
US 2016/0232657 A1    Aug. 11, 2016

(51) Int. Cl.
*G06T 7/00* (2017.01)
*G06T 7/70* (2017.01)

(52) U.S. Cl.
CPC ............ *G06T 7/004* (2013.01); *G06T 7/70* (2017.01); *G06T 2207/10016* (2013.01); *G06T 2207/30244* (2013.01)

(58) Field of Classification Search
CPC . G06T 7/004; G06T 7/70; G06T 2207/30244; G06T 19/006; G09G 5/00; G02B 27/017; G02B 27/0179; H04N 5/225; G06F 3/013

USPC ......................................................... 382/154
See application file for complete search history.

(56) References Cited

U.S. PATENT DOCUMENTS

| | | | |
|---|---|---|---|
| 2002/0175994 A1 | 11/2002 | Sakakibara et al. | |
| 2011/0151970 A1* | 6/2011 | Osman | A63F 13/40 463/30 |
| 2012/0287287 A1 | 11/2012 | Grossmann et al. | |
| 2016/0014350 A1* | 1/2016 | Osman | H04N 5/2621 348/239 |

FOREIGN PATENT DOCUMENTS

WO    2011075226 A1    6/2011

OTHER PUBLICATIONS

Kato, et al: "Marker Tracking and HMD Calibration for a Video-based Augmented Reality Conferencing System", IEEE-ACM, 1999.*

(Continued)

*Primary Examiner* — Ruiping Li
(74) *Attorney, Agent, or Firm* — Blank Rome LLP

(57) ABSTRACT

The invention is related to a method and system for determining a pose of a first camera, comprising providing or receiving a spatial relationship (Rvc1) between a visual content displayed on a display device and the first camera, receiving image information associated with an image (B1) of at least part of the displayed visual content captured by a second camera, and determining a pose of the first camera according to the image information associated with the image (B1) and the spatial relationship (Rvc1).

19 Claims, 4 Drawing Sheets

(56) References Cited

OTHER PUBLICATIONS

Agarwal, Anubhav, C. V. Jawahar, and P. J. Narayanan. "A survey of planar homography estimation techniques." Centre for Visual Information Technology, Tech. Rep. IIT/TR/2005/12 (2005).

Davison et al., "MonoSLAM: Real-time single camera SLAM." Pattern Analysis and Machine Intelligence, IEEE Transactions on 29.6 (2007): 1052-1067.

Hartley, R., et al., "Multiple View Geometry in computer vision," Second Edition, Cambridge University Press 2000, 2003, Chapters 9, 10 and 18; 75 pages.

Horaud, Radu, and Fadi Dornaika, "Hand-eye calibration," The international journal of robotics research 14.3 (1995): 195-210.

Jim Braux-Zin et al., "Calibrating an Optical See-Through Rig with Two Non-overlapping Cameras: The Virtual camera Framework," 3D Imaging, Modeling, Processing, Visualization and Transmission (3DIMPVT), 2012 Seond International Conference on, IEEE, Oct. 13, 2012 (Oct. 13, 2012), pp. 308-315, XP032277289, DOI: 10.1109/3DIMPVT.2012.43, ISBN: 978-1-4673-4470-8.

Lemaire, Thomas, et al. "Vision-based slam: Stereo and monocular approaches." International Journal of Computer Vision 74.3 (2007): 343-364.

Lieberknecht, Sebastian, et al. "RGB-D camera-based parallel tracking and meshing." Mixed and Augmented Reality (ISMAR), 2011 10th IEEE International Symposium on. IEEE, 2011.

Malls, Ezio, and Manuel Vargas. "Deeper understanding of the homography decomposition for vision-based control" (2007). APA.

Pustka, Daniel, et al. "Spatial relationship patterns: Elements of reusable tracking and calibration systems." ISMAR 2006.

Siltanen, Sanni, "Theory and applications of marker-based augmented reality," Espoo 2012, VTT Science 3, http://www.vtt.fi/inf/pdf/science/2012/S3.pdf.

Strasdat, Hauke, J. M. M. Montlel, and Andrew J. Davison. "Scale drift-aware large scale monocular SLAM." Proceedings of Robotics: Science and Systems (RSS). vol. 2. No. 3. 2010.

\* cited by examiner

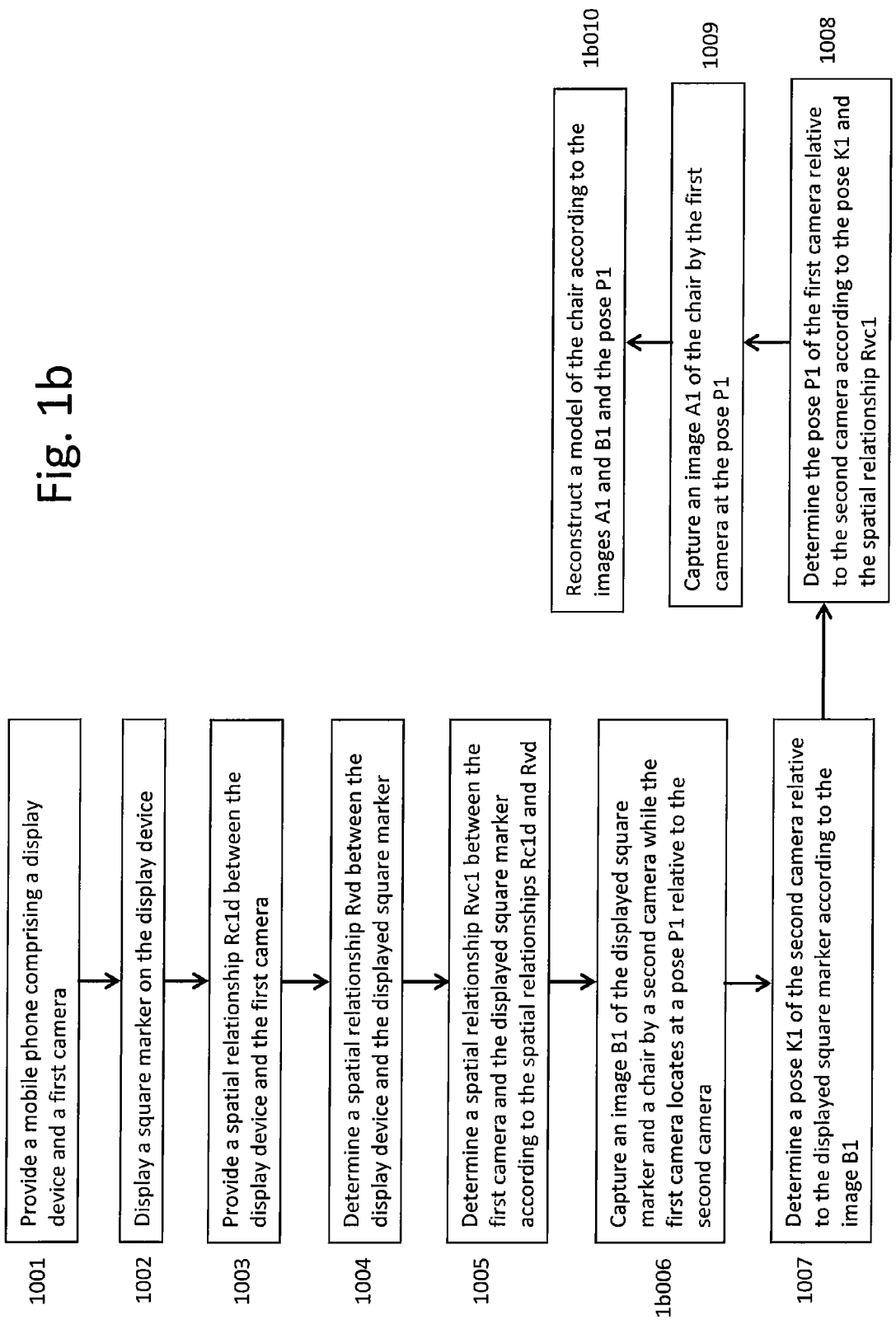

US 9,846,942 B2

METHOD AND SYSTEM FOR DETERMINING A POSE OF CAMERA

BACKGROUND

The present disclosure is related to a method and system for determining a pose of a camera.

SUMMARY

Camera pose estimation is a common and challenging task in many applications or fields, such as robotic navigation, 3D object reconstruction, augmented reality visualization, etc. As an example, it is known that systems and applications, such as augmented reality (AR) systems and applications, could enhance information of a real environment by providing a visualization of overlaying computer-generated virtual information with a view of the real environment. The virtual information can be any type of visually perceivable data such as objects, texts, drawings, videos, or their combination. The view of the real environment could be perceived as visual impressions by user's eyes and/or be acquired as one or more images captured by a camera held by a user or attached on a device held by a user.

A task of camera pose estimation is to compute a spatial relationship or a transformation between a camera and a reference object (or environment). Camera motion estimation is to compute a spatial relationship or a transformation between a camera at one position and the camera at another position. Camera motion is also known as camera pose which describes a pose of a camera at one position relative to the same camera at another position. Camera pose or motion estimation is also known as tracking a camera. The spatial relationship or transformation describes a translation, a rotation, or their combination in 3D space.

Vision based methods are known as being the most robust and popular methods for computing a camera pose or motion. The vision based methods compute a pose (or motion) of a camera relative to an environment based on one or more images of the environment captured by the camera. However, such vision based methods are relying on the captured images and require detectable visual features in the images. Moreover, poor light conditions and/or textureless environment could make the vision based methods unreliable and robustless. Further, the vision based methods often require a known geometry of at least part of the real environment in order to determine a scale factor for the computed pose or motion. A correct scale factor defines true camera poses as they are in the real world. However, the known geometry is not often available.

Currently, location sensors, such as GPS or rotation sensors, such as gyroscopes, are used to initialize the vision based pose estimation. However, location sensors, such as GPS, are often inaccurate and imprecise, especially in an indoor environment.

Thus, there is a desire to provide a robust method to determine a camera pose relative to a reference object or environment with a correct scale factor. For example, computer vision (CV) based Simultaneous Localization and Mapping (SLAM), as disclosed in Davison, Andrew J., et al. "MonoSLAM: Real-time single camera SLAM." Pattern Analysis and Machine Intelligence, IEEE Transactions on 29.6 (2007): 1052-1067, is a well-known technology for determining the position and/or orientation of a camera relative to a real environment and creating a geometrical model of the real environment without requiring any pre-knowledge of the environment. The creation of the model of the environment is also called the reconstruction of the environment.

SLAM systems have to be initialized by at least two images of the real environment acquired from a distinct movement of the camera. Furthermore, a single camera does not measure metric scale. Recovered camera poses and the model of the environment are up to a scale as an undetermined factor, see Strasdat, Hauke, J. M. M. Montiel, and Andrew J. Davison. "Scale drift-aware large scale monocular SLAM." Proceedings of Robotics: Science and Systems (RSS). Vol. 2. No. 3. 2010. A correct scale factor defines true camera poses and the size of the reconstructed environmental model as they are in the real world.

Davison et al., in Davison, Andrew J., et al. "MonoSLAM: Real-time single camera SLAM." Pattern Analysis and Machine Intelligence, IEEE Transactions on 29.6 (2007): 1052-1067, propose to introduce calibration objects with known geo-metrical dimension for determining correct scale factors for SLAM systems.

Lemaire at al. in Lemaire, Thomas, et al. "Vision-based slam: Stereo and monocular approaches." International Journal of Computer Vision 74.3 (2007): 343-364 propose to use a stereo camera system to solve the problem of determining scale factors in SLAM systems. However, using a stereo camera is only a partial remedy, since the displacement between the two cameras has to be significant in relation to the distance to the environment in order to reliably compute depth of the environment.

Lieberknecht et al., in Lieberknecht, Sebastian, et al. "RGB-D camera-based parallel tracking and meshing." Mixed and Augmented Reality (ISMAR), 2011 10th IEEE International Symposium on. IEEE, 2011, integrate depth information into monocular vision based SLAM to allow correctly scaled camera pose estimation by employing a RGB-D camera that provides depth information related to image pixels. It is possible to determine a scale factor from known depth information. However, a RGB-D camera device is not commonly available in a hand-held device, e.g. mobile phone, PDA, compared to a normal RGB camera.

In addition to SLAM, various vision based methods for camera pose estimation have been developed, such as using visual markers. Pustka et al., in Pustka, Daniel, et al. "Spatial relationship patterns: Elements of reusable tracking and calibration systems." ISMAR 2006, attach physical spherical markers to a camera and determine poses or motions of the camera by using other cameras to detect the spherical markers' positions.

Grossmann et al., in U.S. Publication No. 2012/0287287 A, disclose determining a camera position relative to a display device according to images of visual contents displayed on the display device captured by the camera.

Osman, in PCT Publication No. WO 2011/075226 A1, proposes a method for locating a camera of a gaming console relative to a display device. He discloses determining a camera position relative to a display device by analyzing images of visual contents displayed on the display device captured by the camera.

It is an object of the invention to provide a robust method to determine a camera pose relative to a reference object.

According to an aspect, there is provided a method for determining a pose of a first camera, comprising providing or receiving a spatial relationship between a visual content displayed on a display device and the first camera, receiving image information associated with an image of at least part of the displayed visual content captured by a second camera, and determining a pose of the first camera according to the image information associated with the image and the spatial relationship.

According to another aspect, there is provided a system for determining a pose of a first camera, comprising a processing device configured to provide or receive a spatial relationship between a visual content displayed on a display device and the first camera, wherein the processing device is configured to receive image information associated with an image of at least part of the displayed visual content captured by a second camera, and the processing device is configured to determine a pose of the first camera according to the image information associated with the image and the spatial relationship.

The present invention proposes to determine a pose or a motion of a first camera by using a second camera to capture one or more images of a visual content displayed on a display device that has a known or fixed spatial relationship with the first camera.

The first camera could be fixed or have a known position with respect to the display device. For example, the display device and the first camera could be attached to a mobile device (e.g. a mobile phone or a tablet computer) at fixed or known positions. Visual contents displayed on the display device could be textured. Further the displayed visual contents may have known sizes, e.g. obtained from their resolutions. It is possible and robust to determine a pose or motion of the first camera by using the second camera to capture images of a visual content displayed on the display device. Further, if the second camera is at substantially the same position with respect to an environment, e.g. the earth or an in-door environment, while the first camera moves with respect to the environment, the present invention could also be used to robustly estimate a motion of the first camera in the environment. The first camera may further acquire images of the environment. The estimated motion of the first camera and image information associated with the images (such as raw image data or processed image data) captured by the first camera can be used to reconstruct at least part of the environment or to initialize a simultaneous localization and mapping (SLAM) system.

According to an embodiment, the first camera and the display device are physically connected.

For example, the first camera is at a fixed position with respect to the display device after the spatial relationship is provided.

Preferably, the first camera and the display device are comprised in a mobile device. A mobile computing device, such as a mobile phone, a tablet computer, or a laptop computer, nowadays often comprises a camera and a display device. Typically, the camera and the display device have fixed or known positions relative to the mobile device.

According to an embodiment, the method further comprises determining a pose of the second camera relative to the displayed visual content according to the image.

According to an embodiment, the displayed visual content has a known visual appearance.

For example, the spatial relationship between the displayed visual content and the first camera is determined by a calibration procedure, for example by a hand-eye calibration.

According to an embodiment, the pose of the first camera is a pose of the first camera relative to the second camera, and wherein the determining the pose of the first camera comprises determining a pose of the second camera relative to the displayed visual content according to the image information associated with the image.

According to an embodiment, the method further comprises receiving image information associated with a first image of at least part of a real environment captured by the first camera at the pose relative to the second camera, wherein the image of at least part of the displayed visual content captures the at least part of the real environment, and reconstructing a model of the at least part of the real environment according to the image information associated with the image of at least part of the displayed visual content and the first image, and the pose.

According to another embodiment, the method further comprises receiving image information associated with a first image of at least part of a real environment captured by the first camera at the pose relative to the second camera, wherein the pose is a first pose, receiving image information associated with a second image of the at least part of the real environment captured by the first camera at a second pose relative to the second camera, and reconstructing a model of the at least part of the real environment according to the image information associated with the first and second images and the first and second poses.

For example, the method may further comprise receiving image information associated with a further image of at least part of the displayed visual content captured by the second camera while the first camera is at the second pose relative to the second camera, and determining the second pose of the first camera relative to the second camera according to the image information associated with the further image and the spatial relationship between the displayed visual content and the first camera.

According to another embodiment of the method, in which the pose of the first camera is relative to a real object, the determining the pose of the first camera comprises receiving image information associated with an image of at least part of the real object captured by the second camera, determining a homography according to image positions of the at least part of the displayed visual content in the image of at least part of the displayed visual content and image positions of the at least part of the real object in the image of at least part of the real object, wherein the at least part of the displayed visual content is planar and the at least part of the real object is planar, and determining the pose of the first camera relative to the real object according to the homography and the spatial relationship.

According to an embodiment, the image of at least part of the displayed visual content and the image of at least part of the real object are the same image or different images, and wherein the visual content is a first visual content, the display device is a first display device, and the real object is a second visual content displayed on a second display device.

According to another embodiment of the method, in which the pose of the first camera is a pose of the first camera at a first position while the image is captured relative to the first camera at a second position, the determining the pose of the first camera comprises receiving image information associated with a further image of at least part of the displayed visual content captured by the second camera while the first camera is at the second position, determining a homography according to image positions of the at least part of the displayed visual content in the image and in the further image, wherein the at least part of the displayed visual content is planar, and determining the pose of the first camera according to the homography and the spatial relationship.

For example, the method may further comprise receiving image information associated with a first image of at least part of a real environment captured by the first camera at the first position, receiving image information associated with a second image of at least part of the real environment captured by the first camera at the second position, and reconstructing a model of the at least part of the real environment according to the image information associated with the first and second images and the pose of the first camera.

Regarding the system for determining a pose of a first camera, according to an embodiment, the processing device may be comprised in a mobile device which comprises the first camera. For example, the method may be implemented as an application which runs on the processing device of a mobile device, such as a mobile phone, comprising the first camera and the display device, and which communicates with a device, such as a head mounted display, comprising the second camera (e.g. attached to the head mounted display).

According to another embodiment, the processing device is comprised in a mobile device which comprises the second camera. For example, the method may be implemented as an application which runs on the processing device of a mobile device, such as a head mounted display, comprising the second camera, and which communicates with a mobile device, such as a mobile phone, comprising the first camera and the display device.

According to another embodiment, the processing device is comprised in a computer device which communicates with a first mobile device comprising the first camera and with a second mobile device comprising the second camera. For example, the method may be implemented as an application which runs on the processing device of a computer, such as a mobile computer or a personal computer, communicating with a mobile device, such as a head mounted display, comprising the second camera and with a mobile device, such as a mobile phone, comprising the first camera and the display device.

For example, the mobile device comprising the first camera is a hand held device, such as a mobile phone, a tablet computer or a mobile computer. According to an embodiment, the second camera is comprised in a mobile device, such a head mounted display device.

According to another aspect, the invention is also related to a computer program product comprising software code sections which are adapted to perform a method according to the invention when loaded into the internal memory of a processing device. Particularly, the computer program product is contained on a computer readable medium and is non-transitory. The software code sections may be loaded into a memory of one or more of the processing devices as described herein.

The display device is a device for presentation of information in visual, i.e. visual contents. The display device could be based on any displaying technologies or materials, such as Cathode ray tube (CRT), light-emitting diode display (LED) and liquid crystal display (LCD). The display may be a 2-dimensional planar display or a display having a curved shape. The display may also be a foldable display consisting of multiple planar sub-displays, each of which could be moveable with others.

The visual content is any visually perceivable information to anatomical eyes or optical imaging devices. For example, the visual content may emit or reflect visible light that could be captured by human eyes or cameras. The visual content may also emit or reflect invisible light that could not be captured by human eyes, but could be captured by a camera. For example, the visual content may be an infrared figure and can be captured by an infrared camera. The visual content could be text, one or more figures, one or more images generated by computers or captured by cameras, symbols, drawings, or any combinations thereof. The visual content can be displayed on the display device.

The first camera and the second camera are optical imaging devices that could capture imagery information of optical information.

The proposed invention can be employed with any type of camera providing images. It is not restricted to cameras providing color images in the RGB format. It can also be applied to any other color format and also to monochrome images, for example to cameras providing images in grayscale format. The first and/or second camera may further provide an image with depth data. The depth data does not need to be provided in the same resolution as the (color/grayscale) image. A camera providing an image with depth data is often called RGB-D camera. A RGB-D camera system could be a time of flight (TOF) camera system. The camera may also capture light that is invisible to human eye, such as infrared light. For example, the first and/or second camera may be a thermal imaging camera.

Particularly, a visual appearance of the displayed visual content describes shape, texture, or their combinations. The visual appearance may or may not include color information.

A physical geometry of an object describes size, shape, dimension, and/or planarity, or their combinations for the object in the real world.

A resolution of the display device is the number of distinct pixels in each dimension that can be displayed on its display area. The display device may have a known resolution. The display device may further have a known physical geometry for its display area. The physical geometry of the display device refers to the physical geometry for the display area of the display device. For example, having a pixel position of the displayed visual content in a coordinate system of the display device, and the resolution and the physical geometry of the display device, a spatial relationship between the displayed visual content and the display device can be determined. Further, a physical geometry of the displayed visual content can also be determined.

According to another embodiment, having the visual appearance of the displayed visual content and the physical geometry of the display device, the spatial relationship between the displayed visual content and the display device could also be determined according to an image capturing, both, the displayed visual content and the display device without knowing the resolution of the display device and the pixel position of the displayed visual content. This relies on an assumption that the visual content is displayed on the top surface of the display device. For example, if the display device is planar, the displayed visual content locates on the same plane as the display device in 3D space. Various computer vision and image processing methods can be applied to first determine the 3D position of the planar display device according to the physical geometry of the display device. The 3D position of the plane of the display device also defines a plane where the display visual content locates. Then, having the plane information and the captured image, the physical geometry of the displayed visual content and the spatial relationship between the displayed visual content and the display device can be determined.

A spatial relationship between the first camera and the display device may be known. The spatial relationship between the first camera and the display device could also be calibrated by a calibration procedure, such as a hand-eye calibration, see for example Horaud, Radu, and Fadi Dornaika. "Hand-eye calibration." The international journal of robotics research 14.3 (1995): 195-210. The first camera should be at a substantially fixed position with respect to the display device during and after the calibration. If the first camera moves with respect to the display device, the spatial relationship may have to be re-calibrated again, unless the movement is known or determined. The first camera may be preferred to be fixed relative to the display device after the calibration.

The spatial relationship between the displayed visual content and the first camera may be known or determined according to the spatial relationship between the displayed visual content and the display device and the spatial relationship between the first camera and the display device.

The spatial relationship between the displayed visual content and the first camera could also be determined by a calibration procedure, such as a hand-eye calibration. This requires that the visual content is displayed on the display device while the calibration procedure is conducted.

The first camera and the display device are preferred to be physically connected. The first camera is preferably at a fixed position with respect to the display device after determining or providing the spatial relationship between the displayed visual content and the first camera.

The pose of the first camera to be determined may be a pose of the first camera relative to the second camera. A pose of the second camera relative to the displayed visual content may be determined according to an image of at least part of displayed visual content captured by the second camera. The pose of the first camera relative to the second camera may be determined according to the determined pose of the second camera and the spatial relationship between the displayed visual content and the first camera.

The pose of the first camera to be determined may be a pose of the first camera relative to a real object. At least part of the displayed visual content and at least part of the real object may be captured by one image using the second camera. The at least part of the displayed visual content and the at least part of the real object may also be captured by two images respectively using the second camera. When the at least part of the displayed visual content and the at least part of the real object are planar, a planar homography may be estimated according to image positions of the at least part of the displayed visual content and the at least part of the real object, like proposed in Agarwal, Anubhav, C. V. Jawahar, and P. J. Narayanan. "A survey of planar homography estimation techniques." Centre for Visual Information Technology, Tech. Rep. IIIT/TR/2005/12 (2005). A pose of the displayed visual content relative to the real object may be determined according to the estimated planar homography by a homography decomposition method, like proposed in Malis, Ezio, and Manuel Vargas. "Deeper understanding of the homography decomposition for vision-based control." (2007). APA. The pose of the first camera relative to the real object may be determined according to the pose of the displayed visual content relative to the real object and the spatial relationship between the displayed visual content and the first camera. The at least part of the real object may also include another visual content displayed on another display device.

The pose of the first camera to be determined may be a pose of the first camera at a first position relative to the same first camera at a second position. The first position and the second position are different positions in a coordinate system of the second camera. A first image of at least part of the displayed visual content may be captured by the second camera while the first camera is at the first position. A second image of the at least part of the displayed visual content may be captured by the second camera while the first camera is at the second position. When the at least part of the displayed visual content is planar, a planar homography may be estimated according to image positions of the at least part of the displayed visual content in the first and second images, like proposed in Agarwal, Anubhav, C. V. Jawahar, and P. J. Narayanan. "A survey of planar homography estimation techniques." Centre for Visual Information Technology, Tech. Rep. IIIT/TR/2005/12 (2005). A spatial relationship between the visual content displayed on the display device connected to the first camera while the first camera is at the first position and at the second position may be determined according to the estimated planar homography by a homography decomposition method, like proposed in Malis, Ezio, and Manuel Vargas. "Deeper understanding of the homography decomposition for vision-based control." (2007). APA. The pose of the first camera at the first position relative to the same first camera at the second position may be determined according to the spatial relationship between the visual content and the spatial relationship between the displayed visual content and the first camera.

In another example, the first camera at the second position may be another camera connected with another display device that is different from the first camera and the display device connected to the first camera. The another display device may display another visual content that is different from the visual content displayed on the display device connected to the first camera. At least part of the displayed visual content and at least part of the another displayed visual content may be captured by one image or captured respectively by two images using the second camera. The pose of the first camera at the first position relative to the another camera at the second position may be determined according to the same method disclosed above.

The system for determining a pose of a first camera has at least one processing device, such as a microprocessor, such as provided in a mobile phone, a tablet computer, a laptop, or a desktop PC. The determination or estimation of camera poses, camera motions, and models of at least part of a real environment may be performed by such processing device.

In one embodiment, the system for determining the pose of the first camera may be a mobile device and further comprise the first camera and the display device attached to the mobile device. The first camera is preferred to be at a fixed position relative to the display device in the system. A spatial relationship between the first camera and the display device attached to the system may be known or calibrated by a calibration procedure, such as hand-eye calibration.

The system for determining the pose of the first camera may be separate from the second camera. The system could receive from the second camera, or from a device communicating with the second camera, image information associated with images captured by the second camera and/or camera intrinsic parameters. The system may communicate with the second camera or device via a cable, wirelessly or via a computer network.

In another embodiment, the system for determining the pose of the first camera comprises the second camera and is separate from the first camera and the display device. In this embodiment, the system could receive information (e.g. visual appearance) related to the visual content and/or to the display device from the display device and further receive image information associated with images captured by the first camera and/or camera intrinsic parameters from the first camera via a cable, wirelessly or via a computer network.

In another embodiment, the system for determining the pose of the first camera may be separate from the first camera, the display device, and the second camera. In this case, the system could receive information (e.g. visual appearance) related to the visual content and/or to the display device from the display device, receive image information associated with images captured by the second camera and/or camera intrinsic parameters from the second camera, and further receive image information associated with images captured by the first camera and/or camera intrinsic parameters from the first camera via a cable, wirelessly or via a computer network.

The computer network may be a telecommunications network that connects devices (e.g. computers) to allow communication and data exchange between systems, software applications, and users. The computers may be connected via cables, or wireless, or both of cables and wireless. For example, the computer network could be an Internet, intranet, local area network, or wide area network.

DESCRIPTION OF THE DRAWINGS

Aspects and embodiments of the invention will now be described with respect to the drawings, in which:

FIG. 1b shows a flowchart of determining a pose of a first camera of a mobile phone using a second camera according to another embodiment of the invention.

DETAILED DESCRIPTION

According to a possible implementation, an exemplary application of the present invention is to determine a pose of a first camera of a mobile phone using a second camera, wherein the mobile phone further comprises a display device. Although various embodiments are described in the following with reference to components as shown in FIG. 2, any other configuration of components, as described herein, can also be used when implementing any of these embodiments.

Figure 2:
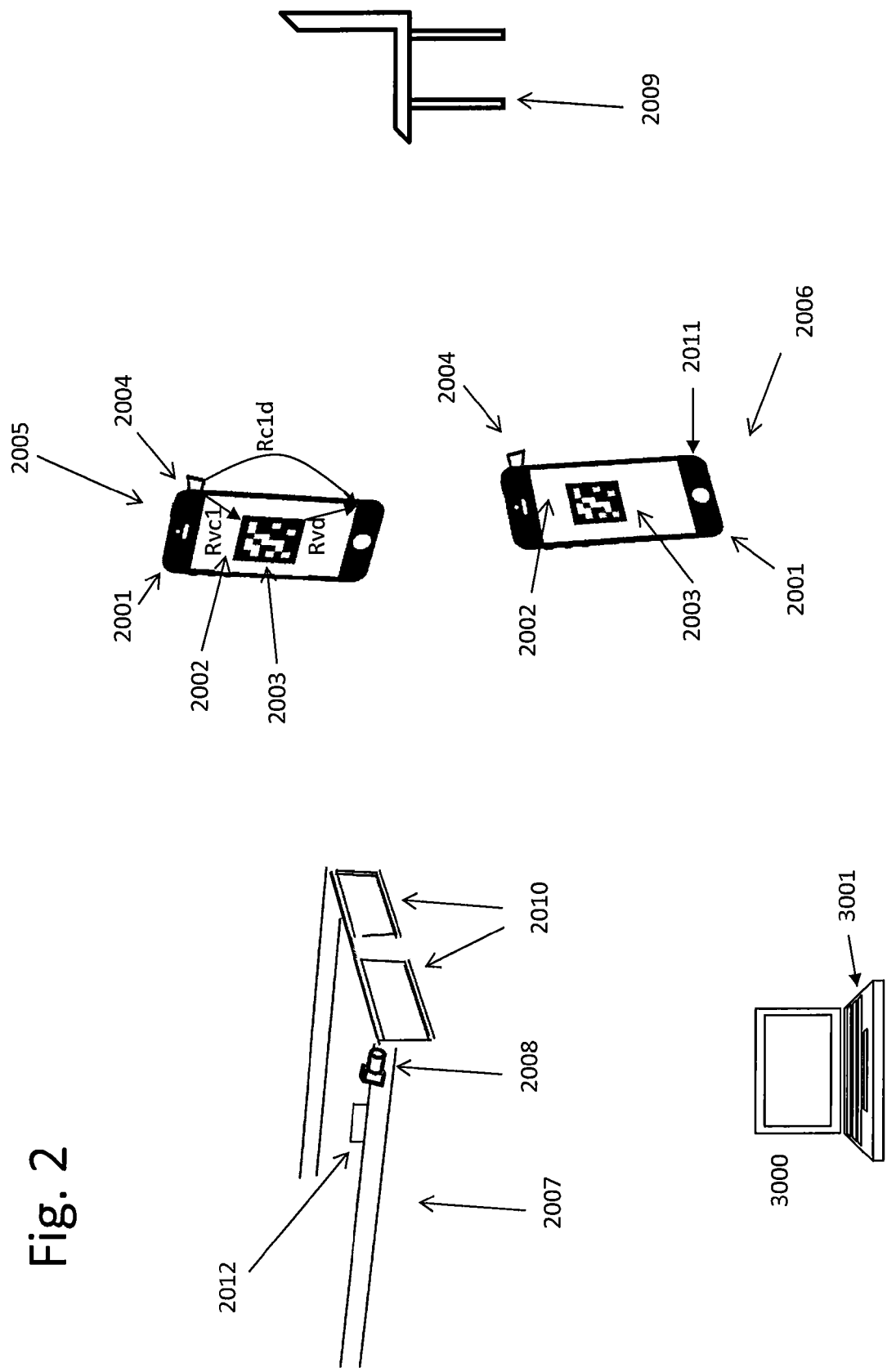
FIG. 2 shows an illustration of an exemplary arrangement of components according to an embodiment of the invention.

FIG. 2 shows an illustration of an exemplary arrangement of components according to an embodiment of the invention in a scenario of tracking a camera 2004 (first camera) that is attached to a mobile device, here a hand-held device (HHD) 2001, such as a mobile phone, equipped with a display device 2002, such as a screen or touchscreen. The tracking of the camera 2004 uses a camera 2008 (second camera) attached to another mobile device, here a head-mounted device (HMD) 2007 which may comprise glasses for providing so-called video-see-through or optical-see-through to a real environment to a user wearing the glasses.

The HHD 2001 has at least one processing device, such as a microprocessor and associated circuitry which are commonly used in the art and not shown in the Figures, since they are internal to the HHD. The internal processing device is indicated with reference number 2011 in FIG. 2. Among other tasks as commonly used and applied in the art, with regard to the present invention the processing device 2011 is configured to display images, such as visual content, on the display device 2002. The processing device 2011 is further applicable to perform tasks and steps as described herein in connection with the invention, such as the steps as described with reference to FIG. 1a, FIG. 1b, or FIG. 1c.

The display device 2002 has a planar displaying area, such as a screen, with a known physical size. In this example, the HHD 2001 may be held by a user and the HMD 2007 is worn at the head of the same or a different user. Camera intrinsic parameters of the camera 2004 and the camera 2008 are provided or determined by a camera calibration procedure.

In this example, the HMD 2007 comprises a semi-transparent display (or semi-transparent glasses) 2010 such that the user sees through the semi-transparent glasses one or more objects of the real environment augmented with computer-generated visual objects blended in on the glasses.

The HMD 2007 has at least one processing device 2012, such as a microprocessor and associated circuitry which are commonly used in the art. Among other tasks as commonly used and applied in the art, with regard to the present invention the processing device 2012 is configured to display visual content on the display 2010. The processing device 2012 is further applicable to perform tasks and steps as described herein in connection with the invention, such as the steps as described with reference to FIG. 1a, FIG. 1b, or FIG. 1c.

According to an embodiment, each of the processing devices 2011 and/or 2012 is appropriate and may be configured to provide or receive spatial relationships as described herein, to receive image information associated with images captured by the first camera 2004 and/or second camera 2008 directly from the respective camera or from another processing device, and to determine poses of the first camera 2004 relative to the second camera 2008 according to received image information and one or more of the spatial relationships, as described in detail herein. These tasks may also be performed by another processing device, such as processing device 3001, which is neither contained in the HHD 2001 nor in the HMD 2007, but in another device 3000, such as a mobile computer, communicating with the HHD 2001 and HMD 2007, e.g. wirelessly. Further, it is possible that all or some of the tasks and steps as described herein may be shared or distributed between the processing devices 2011, 2012 and 3001.

The HHD 2001 and the HMD 2007 may communicate with each other wirelessly. The camera 2004 and the display device 2002 have fixed positions on the HHD 2001. Thus, the camera 2004 is fixed relative to the display device 2002. A spatial relationship Re1 d between the camera 2004 and the display device 2002 is provided by the manufacturer of the HHD 2001. The spatial relationship Rc1 d can also be determined by hand-eye calibration. For example, move the HHD 2001 while estimating a motion Mel of the camera 2004 and a motion Md of the display device 2002. The spatial relationship Rc1 d can then be determined by a hand-eye calibration method (see Horaud, Radu, and Fadi Dornaika. "Hand-eye calibration." The international journal of robotics research 14.3 (1995): 195-210) according to the motions Mel and Md.

The motion Mel of the camera 2004 can be estimated by capturing images of a visual marker placed in a real environment. The motion Mel can be determined using various computer vision methods according to the captured images. The motion Md of the display device 2002 can be estimated by using the camera 2008 of the HMD 2007 to capture images of the display device 2002. Having a known geometric model of the display device, computer vision methods can be used to determine Md according to the captured images. The motion Md may also be estimated by using the camera 2008 of the HMD 2007 to capture images of a visual content displayed on the display device 2002. For this, a known visual appearance of the visual content and its position with respect to the display device are required.

The hand-eye calibration of estimating the spatial relationship Rc1 d may be performed on the HHD 2001 that receives from the HMD 2007 the images of the displayed visual content captured by the camera 2008.

Similarly, a spatial relationship Rya between the camera 2004 and a displayed visual content 2003 can also be estimated according to the hand-eye calibration method (see Horaud, Radu, and Fadi Dornaika. "Hand-eye calibration." The international journal of robotics research 14.3 (1995): 195-210). This requires estimating a motion Mm of the displayed visual content 2003 instead of the motion Md of the display device 2002. The motion Mm may be estimated by using the camera 2008 of the HMD 2007 to capture images of the displayed visual content 2003.

The resolution of the display device 2002 is known. A visual content (here in the form of a square marker) 2003 is displayed at a known pixel position on the display device 2002. The square marker 2003 also has a known pixel size. The square marker could also be replaced by other visual contents, such as menus, buttons, icons, and program user interfaces of the mobile phone, displayed on the display device 2002.

FIG. 1 a shows a flowchart of determining a pose of the camera 2004 (first camera) of the HHD 2001 using the camera 2008 (second camera) and further of reconstructing a model of a chair based on images captured by the camera 2004.

In step 1001, as the HHD 2001 a mobile phone is provided comprising a display device 2002 and a first camera 2004. In step 1002, a square marker 2003 is displayed on the display device 2002 as a visual content. In step 1003, a spatial relationship Rc1 d between the display device 2002 and the first camera 2004 is provided. The spatial relationship Rd d is often known from the mobile phone manufacturer. The spatial relationship Rc1 d could also be calibrated, as described above. In step 1004, a spatial relationship Rvd between the display device 2002 and the displayed square marker 2003 is determined. Then, a spatial relationship Rya between the first camera 2004 and the displayed square marker 2003 is determined according to the spatial relationships Rc1 d and Rvd (step 1005).

In step 1006, an image B1 of the displayed square marker 2003 is captured by the second camera 2008 while the first camera 2004 locates at a pose P1 relative to the second camera 2008. In step 1007, a pose K1 of the second camera 2008 relative to the displayed square marker 2003 is determined according to the image B1. Instep 1008, the pose P1 of the first camera 2004 relative to the second camera 2008 is determined according to the pose K1 and the spatial relationship Rvc1. In step 1009, an image A1 of a chair, such as chair 2009 in FIG. 2, is captured by the first camera 2004 at the pose P1. Then, the HHD 2001 is moved to another location such that the first camera 2004 locates at a pose P2 relative to the second camera 2008 in step 1010. In step 1011, an image A2 of the chair is captured by the first camera 2004 and an image B2 of the displayed square marker is captured by the second camera 2008 while the first camera 2004 is at the pose P2. In step 1012, the pose P2 is determined according to the spatial relationship Rvc1 and the image B2. Thereafter, a model of the chair 2009 may be reconstructed according to the images A1 and A2 and the poses P1 and P2 in step 1013.

The spatial relationship Rvd between the displayed square marker 2003 and the display device 2002 may be determined as follows: Having a resolution of the display device 2002, the physical size of the displaying area of the display device 2002, the pixel position and pixel size of the square marker 2003, the physical size of the displayed square marker 2003 and its spatial relationship Rvd with respect to the display device 2002 can be determined. This step could be performed on the HHD 2001.

The spatial relationship Rvc1 between the displayed square marker 2003 and the camera 2004 is determined according to the spatial relationship Rvd and the spatial relationship Rd d.

The camera 2008 captures an image B1 of the displayed square marker 2003. A pose K1 of the camera 2008 relative to the displayed square marker 2003 is determined according to the image B1 by using computer vision methods, such as in Sanni Siltanen, Theory and applications of marker-based augmented reality. Espoo 2012. VTT Science 3. http://www.vtt.fi/inf/pdf/science/2012/83.pdf. The determination of the pose K1 is performed on the HHD 2001 that receives from the HMD 2007 the image B1. This could also be performed on the HMD 2007.

Generally, the computer vision methods used to determine the pose K1 can load what is shown on the display device 2002 as a target image or a reference image to initialize the determination of the pose K1.

A pose P1 (the location of which is indicated by 2005 in FIG. 2) of the camera 2004 relative to the camera 2008 can be computed according to the pose K1 and the spatial relationship Rvc1. At the pose P1, the camera 2004 captures image A1 of the chair 2009 located in a room.

The user could move the HHD 2001 to another location 2006 and use the camera 2004 to capture an image A2 of the chair 2009 at a pose P2 relative to the second camera 2008. The pose P2 can be determined in the same manner as with determining the pose P1.

If the user does not move the head (i.e. the camera 2008 of the HMD 2007) with respect to the chair 2009 when the camera 2004 is placed at the poses P1 and P2, a model of the chair 2009 can be reconstructed based on a triangulation method (see, e.g., Hartley, Richard, and Andrew Zisserman. Multiple view geometry in computer vision. Vol. 2. Cambridge, 2000) using the images A1 and A2 and the poses P1 and P2. The reconstructed model of the chair will have a correct scale factor.

The pose K1 of the second camera 2008 relative to the displayed visual content 2003 can be determined according to the image B1 of the displayed visual content captured by the second camera 2008. Having the known visual appearance of the displayed visual content 2003 and its physical geometry, the pose K1 can be determined with a correct scale factor. The pose estimation could be based on correspondences between image features of the image B1 and corresponding features of the visual content 2003 displayed on the display device 2002.

The pose P1 of the first camera 2004 relative to the second camera 2008 can be determined according to the pose K1 and the spatial relationship Rvc1.

The real environment could be an indoor office or an outdoor scene. The real environment could also be or include a real object, such as a sofa, a car, a human, a tree, and a building. The at least part of the real environment could be a part of the real environment and/or at least one real object located in the real environment.

The image A2 of the at least part of the real environment may be captured by the first camera 2004 while the first camera is at pose P2 relative to the second camera 2008. The poses P1 and P2 are different.

The image B2 of at least part of the visual content (or another visual content) 2003 displayed on the display device 2002 could be captured by the second camera 2008 while the first camera 2004 is at the pose P2 relative to the second camera 2008.

A pose K2 of the second camera 2008 relative to the displayed visual content 2003 is determined according to the image B2. The pose P2 of the first camera 2004 relative to the second camera 2008 is determined according to the pose K2 of the second camera 2008 relative to the visual content 2003 and the spatial relationship Rvc1.

Further, if the second camera 2008 keeps unmoved relative to the at least part of the real environment when the first camera 2004 locates at the poses P1 and P2, it is possible to determine a motion of the first camera 2004 with respect to the at least part of the real environment according to the poses P1 and P2. The determined motion could have a correct scale factor.

If the second camera 2008 keeps unmoved relative to the at least part of the real environment when the first camera 2004 locates at the poses P1 and P2, a model of the at least part of the real environment could be reconstructed according to the images A1 and A2 and the poses P1 and P2. In one example of reconstructing the model, correspondences between image features of the at least part of the real environment in the images A1 and A2 may be determined. Then, a triangulation method, like proposed in Hartley, Richard, and Andrew Zisserman. Multiple view geometry in computer vision. Vol. 2. Cambridge, 2000, can be used to determine the model from the image feature correspondences and the poses P1 and P2.

Further, if the display device 2002 keeps unmoved relative to the at least part of the real environment when the second camera 2008 locates at the poses K1 and K2 relative to the display device 2002, it is possible to determine a motion of the second camera 2008 with respect to the at least part of the real environment according to the poses K1 and K2. The determined motion could have a correct scale factor. The motion of the second camera 2008 may also be determined according to image positions of the displayed visual content 2003 in the images B1 and B2. For example, a planar homography may be estimated based on the image positions of the displayed visual content 2003 in the images B1 and B2 (see Agarwal, Anubhav, C. V. Jawahar, and P. J. Narayanan. "A survey of planar homography estimation techniques." Centre for Visual Information Technology, Tech. Rep. IIIT/TR/2005/12 (2005)). The motion of the second camera 2008 may be determined according to homograph decomposition (see Malis, Ezio, and Manuel Vargas. "Deeper understanding of the homography decomposition for vision-based control." (2007). APA). If the images B1 and B2 capture same at least part of the real environment, a model of the at least part of the real environment could be reconstructed according to the images B1 and B2 and the poses K1 and K2 or according to the images B1 and B2 and the motion of the second camera 2008.

FIG. 1b shows another flowchart of determining a pose of the camera 2004 (first camera) of the HHD 2001 using the camera 2008 (second camera) and further of reconstructing a model of a chair based on an image captured by the camera 2004 and an image captured by the camera 2008.

Figure 1A:
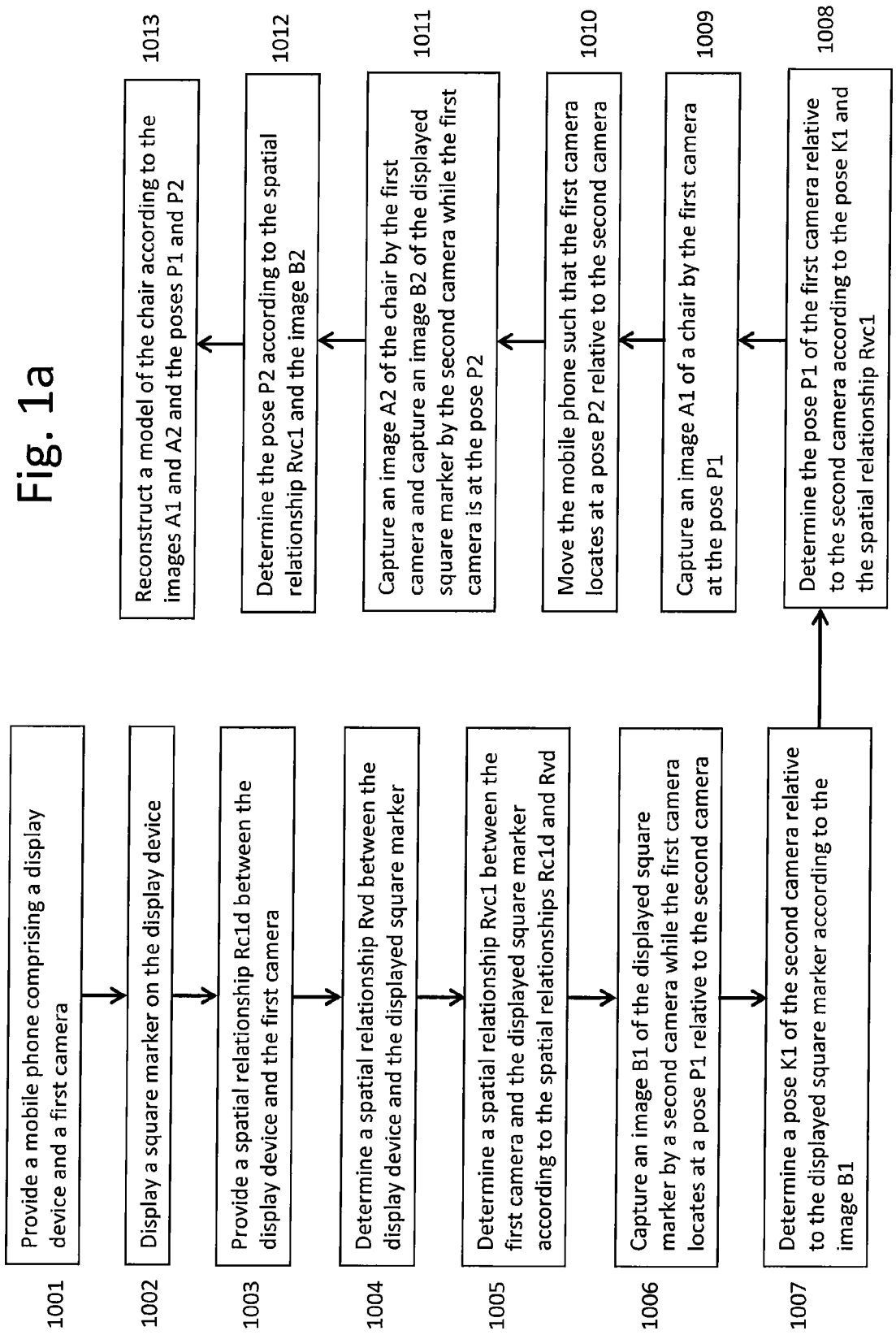
FIG. 1a shows a flowchart of determining a pose of a first camera of a mobile phone using a second camera according to an embodiment of the invention.

Steps 1001, 1002, 1003, 1004, 1005, 1007, 1008 and 1009 in FIG. 1b are the same as the ones in FIG. 1a that are described above. In step 1b006, the second camera captures an image B1 of the displayed square marker and a chair. Image information related to the displayed visual marker in the image B1 is used to determine the pose P1 of the first camera relative to the second camera. The pose P1 describes a spatial relationship between the first camera and the second camera while the image A1 is captured by the first camera and the image B1 is captured by the second camera. In step 1b010, a model of the chair may be reconstructed according to the images A1 and B1 and the pose P1 based on the triangulation method.

The camera 2004 and the camera 2008 could be synchronized such that it is possible to enable the camera 2004 to capture an image (e.g. the image A1) and the camera 2008 to capture another image (e.g. the image B1) at a same moment, and/or to relate an image captured by the camera 2004 and another image captured the camera 2008 if the two images are captured at a same moment.

The camera 2004 and the display device 2002 of the device HHD 2001 may be synchronized using the same internal processing device 2011. The camera 2004 and the camera 2008 may be synchronized by displaying a specific visual content on the display device 2002 and detecting the specific visual content in an image captured by the second camera 2008. For example, the internal processing device 2011 may control the camera 2004 to capture the image A1 and control the display device 2002 to display the square marker 2003 only at the moment while the image A1 is captured. The camera 2008 continuously captures images of visual contents displayed on the display device 2002. As soon as the square marker 2003 is detected in an image captured by camera 2008, this image is used as the image B1. In this way, it is possible that the image A1 and the image B1 are captured at the same moment.

The synchronization method mentioned above can also be applied to synchronize processing steps executed on the HHD 2001 and executed on the HMD 2007.

Figure 1C:
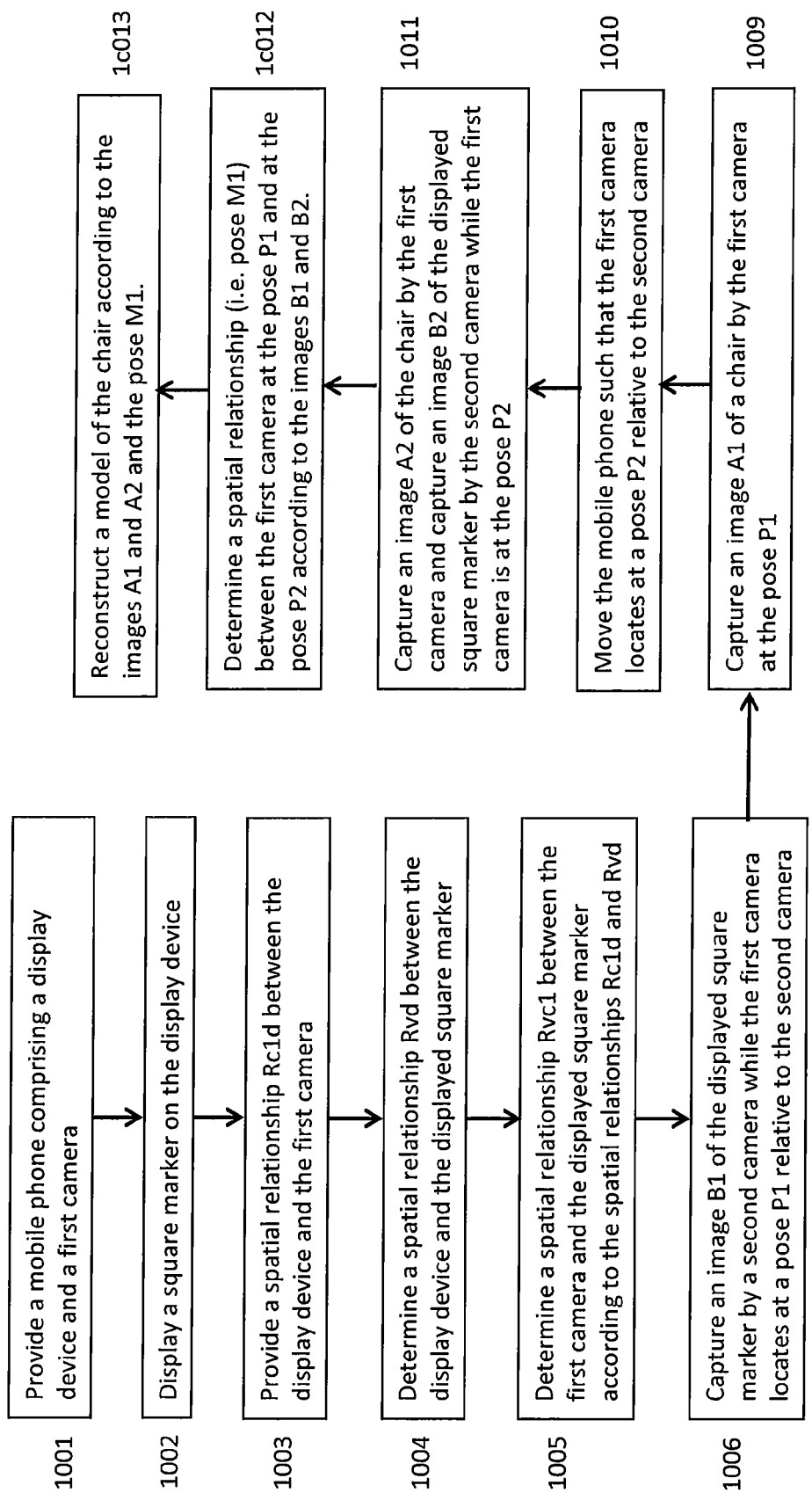
FIG. 1c shows a flowchart of determining a pose of a first camera of a mobile phone using a second camera according to a further embodiment of the invention.

FIG. 1c shows another flowchart of determining a spatial relationship between the camera 2004 (first camera) of the HHD 2001 at different poses relative to the camera 2008 (second camera) and further of reconstructing a model of a chair based on images captured by the camera 2004.

Steps 1001, 1002, 1003, 1004, 1005, 1006, 1009, 1010 and 1011 in FIG. 1e are the same as the ones in FIG. 1a that are described above. Step 1c012 determines the spatial relationship (i.e. pose M1) between the first camera 2004 at the pose P1 and at the pose P2 according to the images B1 and B2. The pose M1 describes a pose of the first camera 2004 at a first position (pose P1) relative to the same first camera 2004 at a second position (pose P2). The pose Ml may also be called as camera motion for the same first camera. The displayed visual content 2003 is planar, and thus a planar homography can be estimated based on image positions of the displayed visual content 2003 in the images B1 and B2. The pose Ml can be determined by decomposing the estimated planar homography using a method, like proposed in Malis, Ezio, and Manuel Vargas. "Deeper understanding of the homography decomposition for vision-based control." (2007). APA. In step 1c013, a model of the chair is reconstructed according to the images A1 and A2 and the pose M1.

In all examples described above, there is only one mobile device (here mobile phone), i.e. the HHD 2001. The HHD 2001 may locate at the two different locations 2005 and 2006. It is obvious that the HHD 2001 located at one of the locations 2005 and 2006 may be replaced by another mobile device comprising another display device and another camera. In this case, the another display device of the another mobile device may display another visual content different from the visual content 2003 in order to distinguish the another mobile device from the HHD 2001. Further, the second camera may capture only one image that captures both the visual content 2003 and the another visual content.

Generally, the reconstructed model at least describes the depth information of the at least part of the real environment. The model may further include one of the following attributes, but not limited to: shape, symmetry, planarity, geometrical size, color, texture and density.

The reconstructed model of the at least part of the real environment could have a correct scale factor. The reconstructed model can be represented as a model comprising 3D vertices and polygonal faces and/or edges spanned by these vertices. Edges and faces of the model may also be represented as splines or NURBS surfaces.

Furthermore, the reconstructed model can further be used to initialize a vision based SLAM system for tracking the first camera in the real environment and/or reconstructing a model of other parts of the real environment. This does not need the second camera.

According to an embodiment, the HHD 2001 and the camera 2004 could be tracked in the room using images captured by the camera 2004 based on a SLAM method (see, e.g., Davison, Andrew J., et al. "MonoSLAM: Real-time single camera SLAM." Pattern Analysis and Machine Intelligence, IEEE Transactions on 29.6 (2007): 1052-1067). The SLAM method is initialized by the reconstructed model of the real environment. The model of the interior of the room can also be reconstructed based on the monocular SLAM method using the first camera 2004. This procedure does not need the camera 2008 and the HMD 2007. Thus, the user could freely move his head and walk in the room. This way is particularly beneficial to single camera based SLAM methods.

Similarly, the display device 2002 of the HHD 2001 could also be tracked in the room based on SLAM, as the camera 2004 and the display device 2002 have a known spatial relationship. This does not need to display the visual marker 2003.

Placing a virtual object in a real environment such that people could view the virtual object later using an augmented reality system is a challenging task.

The display device 2002 (i.e. the HHD 2001) could be used as a physical representative of the virtual object. In contrast to using other physical objects, the display device could display visual information, which makes the virtual object visible to the user. Particularly, for a planar virtual object, such as a 2D image or a video, the display device 2002 could display the planar virtual object. Thus, a user could place the planar virtual object in the room in a very intuitive way by moving the display device 2002 that is tracked in the room using the camera 2008. However, a normal physical object that could easily be tracked, such a square marker, does not have this capability of displaying or visualizing the virtual object.

Throughout this document it is described that image information associated with an image is provided or received. It is known to the skilled person that this may include providing or receiving any processed or non-processed information (version) of an image, part of an image and/or features of an image which allows for pose estimation. The invention does not require providing or receiving any raw original image data. Processing thereby includes any one of compression (e.g. JPEG, PNG, ZIP), encryption (e.g. RSA encryption, Schnorr signature, El-Gamal encryption, PGP), conversion to another color space or gray-scale, cropping or scaling the image or conversion into a sparse representation based on feature descriptors, extraction, and their combinations. All these image processing methods can optionally be performed and are covered by the terminology of image information associated with an image.

The invention claimed is:

1. A method for determining a pose of a first camera, the method comprising:
   obtaining a spatial relationship between a first camera and visual content displayed on a display device;
   receiving first image data corresponding to a first image captured by a second camera, the first image depicting at least part of the visual content displayed on the display device; and
   determining a first pose of the first camera relative to the second camera based on:
      a second pose of the second camera relative to the visual content displayed on the display device, the second pose determined based on the first image data; and
      the spatial relationship.

2. The method according to claim 1, wherein the first camera and the display device are included in a mobile device, the method further comprising determining the spatial relationship based on:
   an orientation of the first camera in the mobile device with respect to the display device; and
   an orientation of the visual content displayed on the display device.

3. The method according to claim 1, further comprising:
   receiving second image data corresponding to a second image captured by the first camera at the first pose and depicting at least part of an environment, wherein the first image further depicts the at least part of the environment; and
   constructing a model of the at least part of the environment based on the first image data, the second image data, and the first pose.

4. The method according to claim 1, further comprising:
   receiving second image data corresponding to a second image depicting at least part of an environment and captured by the first camera at the first pose;
   receiving third image data corresponding to a third image depicting the at least part of the environment and captured by the first camera at a third pose relative to the second camera; and
   constructing a model of the at least part of the environment based on the second image data, the third image data, the first pose, and the third pose.

5. The method according to claim 4, further comprising:
   receiving fourth image data corresponding to a fourth image depicting at least part of the visual content displayed on the display device, wherein the fourth image is captured by the second camera while the first camera is at the third pose relative to the second camera; and
   determining the third pose of the first camera relative to the second camera based on the fourth image data and the spatial relationship.

6. The method according to claim 1, further comprising:
   receiving second image data corresponding to a second image, the second image captured by the second camera and depicting at least part of an object;
   determining a homography based on a first position of the at least part of the visual content in the first image and a second position of the at least part of the object in the second image, wherein the at least part of the visual content displayed on the display device is planar and the at least part of the object is planar; and determining a third pose of the first camera relative to the object based on the homography and the spatial relationship.

7. The method according to claim 1, further comprising:

receiving second image data corresponding to a second image captured by the second camera and depicting the at least part of the visual content displayed on the display device, wherein the first camera is located at a first position when the first image is captured, and wherein the first camera is located at a second position when the second image is captured;

determining a homography based on positions of the at least part of the visual content in the first image and the second image, wherein the at least part of the visual content displayed on the display device is planar; and determining a third pose of the first camera at the first position relative to a fourth pose of the first camera at the second position based on the homography and the spatial relationship.

8. The method according to claim 7, further comprising:

receiving third image data corresponding to a third image depicting at least a part of an environment and captured by the first camera at the first position;

receiving fourth image data corresponding to a fourth image depicting the at least part of the environment and captured by the first camera at the second position; and constructing a model of the at least part of the environment based on the third image data, the fourth image data, and the third pose of the first amera.

9. The method according to claim 1, wherein the first camera and the display device are physically connected.

10. The method according to claim 2, further comprising receiving an indication of a type of the mobile device and identifying the orientation of the first camera in the mobile device with respect to the display device based on the indication.

11. The method according to claim 1, further comprising determining the spatial relationship based on a hand-eye calibration technique.

12. A system for determining a pose of a first camera, comprising:

a processing device; and a memory device storing instructions that, when executed by the processing device, configure the processing device to:

identify a spatial relationship between a first camera and visual content displayed on a display device;

receive first image data corresponding to a first image captured by a second camera, the first image depicting at least part of the visual content displayed on the display device; and determine a first pose of the first camera relative to the second camera based on:

a second pose of the second camera relative to the visual content displayed on the display device, the second pose determined based on the first image data; and the spatial relationship.

13. The system according to claim 12, wherein the processing device is comprised in a mobile device that includes the first camera.

14. The system according to claim 12, wherein the processing device is comprised in a mobile device that includes the second camera.

15. The system according to claim 12, wherein the processing device is comprised in a computer device configured to communicate with a first mobile device and a second mobile device, the first mobile device comprising the first camera and the second mobile device comprising the second camera.

16. The system according to claim 12, wherein the first camera and the display device are comprised in a mobile device.

17. The system according to claim 12, wherein the second camera is included in a head mounted display device.

18. A computer readable storage device comprising computer readable code which, when executed by one or more processors, causes the one or more processors to:

obtain a spatial relationship between a first camera and visual content displayed on a display device;

receive first image data corresponding to a first image captured by a second camera, the first image depicting at least part of the visual content displayed on the display device; and determine a first pose of the first camera relative to the second camera based on:

a second pose of the second camera relative to the visual content displayed on the display device, the second pose determined based on the first image data; and the spatial relationship.

19. The computer readable storage device of claim 18, wherein the first camera and the display device are included in a mobile device, the computer readable code further executable by the one or more processors to determine the spatial relationship based on:

an orientation of the first camera in the mobile device with respect to the display device; and an orientation of the visual content displayed on the display device.

* * * * *

UNITED STATES PATENT AND TRADEMARK OFFICE
CERTIFICATE OF CORRECTION

PATENT NO. : 9,846,942 B2
APPLICATION NO. : 15/028474
DATED : December 19, 2017
INVENTOR(S) : Lejing Wang et al.

Page 1 of 1

It is certified that error appears in the above-identified patent and that said Letters Patent is hereby corrected as shown below:

In the Claims

Claim number 8, at Column 17, Line number 32, "first amera" should be changed to -- first camera --

Signed and Sealed this
Sixth Day of November, 2018

Andrei Iancu
*Director of the United States Patent and Trademark Office*